US009409789B2

(12) United States Patent
Yoon et al.

(10) Patent No.: US 9,409,789 B2
(45) Date of Patent: Aug. 9, 2016

(54) STRONTIUM TITANATE POWDER AND METHOD OF PREPARING THE SAME

(71) Applicant: RESEARCH & BUSINESS FOUNDATION SUNGKYUNKWAN UNIVERSITY, Suwon-si (KR)

(72) Inventors: Dae Ho Yoon, Suwon-si (KR); Suk Hyun Song, Yongin-si (KR); Masaki Takaki, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 135 days.

(21) Appl. No.: 14/319,746

(22) Filed: Jun. 30, 2014

(65) Prior Publication Data

US 2015/0010756 A1    Jan. 8, 2015

(30) Foreign Application Priority Data

Jul. 4, 2013    (KR) ........................ 10-2013-0078232

(51) Int. Cl.
*C01G 23/00*    (2006.01)
(52) U.S. Cl.
CPC ........... *C01G 23/006* (2013.01); *C01P 2002/72* (2013.01); *C01P 2004/03* (2013.01); *C01P 2004/62* (2013.01); *C01P 2004/64* (2013.01); *Y10T 428/2982* (2015.01)
(58) Field of Classification Search
CPC .............. C01G 23/006; C01P 2002/72; C01P 2004/03; C01P 2004/64; C01P 2004/62; Y10T 428/2982
USPC .......................................... 428/402; 423/598
See application file for complete search history.

(56) References Cited

U.S. PATENT DOCUMENTS

| 4,228,482 | A | * | 10/1980 | Bouchard | ............... C04B 35/47 252/62.9 R |
| 5,818,686 | A | * | 10/1998 | Mizuno | ............... H01G 4/1209 361/303 |
| 7,697,263 | B2 | * | 4/2010 | Bridger | ............... C04B 35/462 361/306.1 |

FOREIGN PATENT DOCUMENTS

| KR | 10-2001-0106489 A | | 11/2001 |
| KR | 10-0503858 B1 | | 7/2005 |
| KR | 10-2008-0062631 A | | 7/2008 |
| KR | 1020090071311 | * | 1/2009 |
| KR | 10-2009-0071311 A | | 7/2009 |
| KR | 10-0919392 B1 | | 9/2009 |

OTHER PUBLICATIONS

Rabuffetti, Federico A., et al. "Synthesis-dependent first-order Raman scattering in SrTiO3 nanocubes at room temperature." Chemistry of Materials 20.17 (2008): 5628-5635.
Da Silva, Luís F., et al. "Long-range and short-range structures of cube-like shape SrTiO 3 powders: microwave-assisted hydrothermal synthesis and photocatalytic activity." Physical Chemistry Chemical Physics 15.29 (2013): 12386-12393.
Korean Office Action issued on Sep. 16, 2015 in counterpart Korean Patent Application No. 10-2013-0078232 (5 pages, with English translation).

* cited by examiner

*Primary Examiner* — Leszek Kiliman
(74) *Attorney, Agent, or Firm* — NSIP Law

(57) ABSTRACT

Crystalline strontium titanate powder ($SrTiO_3$) and a method of preparing strontium titanate powder ($SrTiO_3$) are provided. A method of preparing strontium titanate powder involves providing an aqueous solution comprising a strontium precursor and a titanium precursor, immersing a polymer compound in the aqueous solution, and heating the aqueous solution in which the polymer compound is immersed.

13 Claims, 10 Drawing Sheets

LPP

STRONTIUM TITANATE POWDER AND METHOD OF PREPARING THE SAME

CROSS-REFERENCE TO RELATED APPLICATION

This application claims the benefit under 35 USC 119(a) of Korean Patent Application No.10-2013-0078232 filed on Jul. 4, 2013, the entire disclosure of which are incorporated herein by reference.

BACKGROUND

1. Field

The following description relates to crystalline strontium titanate powder ($SrTiO_3$) and a method of preparing strontium titanate powder ($SrTiO_3$).

2. Description of Related Art

With the recent miniaturization of multilayer capacitors having high capacity, the dielectric elements used in such capacitors are becoming thinner. In order to fabricate a thin, miniaturized multilayer capacitor, it is necessary to reduce the particle size of particles in the dielectric element and to suppress particle growth. A composite oxide is often used as a source material of the dielectric element. Suitable composite oxide needs to have fine particle sizes and high crystallinity.

Strontium titanate ($SrTiO_3$) powder is often used as the composite oxide material in preparing the dielectric element. The conventional method of preparing the strontium titanate powder involves a solid-state reaction using titanium oxide ($TiO_2$) and strontium carbonate ($SrCO_3$). However, recently, liquid-phase methods have been used for preparing powder having high performance and high purity through uniformity in particle-size distribution and nanoscale crystallization. As the liquid-phase methods used for preparing the strontium titanate powder, a hydrothermal synthesis method, a hydrolysis method, a sol-gel method, a coprecipitation method, and the like have been used.

However, in order to prepare strontium titanate by the above-described methods, a reaction temperature of at least about 150° C. or more needs to be maintained. Further, after the reaction, a hydroxide or a hydrate may form, deteriorating the crystallinity of the powder. To improve the crystallinity of the powder, a high-temperature heat treatment is carried out. However, during the heat treatment, particles may grow large due to the heat energy introduced from the heat treatment. Thus, an additional milling process may be required in order to obtain fine-size particles. The powder that results from such a process may have surface defects and may have irregular overall shape. Further, it is difficult to control powder composition, such as the ratio between Sr and Ti, and the particle size. Furthermore, unground particles may remain; thus, during mixing or molding of the powder, dispersibility is reduced and sinterability is low. Therefore, abnormal crystal grains may easily result from the process. Further, as described above, the average particle size of the obtained powder may be several hundred nanometers or more; thus, it is impossible to obtain nanoscale particles. Currently, particles are generated through a bottom-up method; however, the produced particles need to undergo post-processing steps of a top-down method. Thus, the fabrication process is complex and inefficient.

Korean Patent No. 10-0503858 relates to a method of preparing nanoscale crystalline strontium titanate powder from a titanium tetrachloride aqueous solution prepared from inorganic acid and a strontium carbonate aqueous solution, and to a method comprising: mixing a titanium tetrachloride aqueous solution with a strontium carbonate aqueous solution; adjusting a pH to obtain a precipitate; washing the precipitate to adjust a pH again; and filtering and drying to obtain strontium titanate powder. However, according to the above-described preparation method, it is necessary to separate a precipitate and an additional drying process is needed; thus, the production process is complicated. Further, when the precipitate is separated, it may contain a by-product. Therefore, strontium titanate powder prepared by the above-described method is unstable in terms of its crystal structure.

Due to the issues pointed out above, it is desirable to develop a method of preparing strontium titanate powder that has a high crystallinity due to a precise control of the composition of the compound, is not sensitive to moisture, can be mass-produced, and formed into fine powder.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of preparing strontium titanate powder involves: providing an aqueous solution comprising a strontium precursor and a titanium precursor, immersing a polymer compound in the aqueous solution, and heating the aqueous solution in which the polymer compound is immersed.

The heating of the aqueous solution may involve performing a first heat treatment and a second heat treatment, and the first heat treatment and the second heat treatment may be carried out sequentially or cooling may be performed after the first heat treatment and before the second heat treatment.

The first heat treatment may involve heating the aqueous solution to a temperature in a range of approximately 300° C. to 600° C.

The second heat treatment may involve heating the aqueous solution to a temperature in a range of approximately 700° C. to 1,200° C.

The strontium precursor may include a member selected from the group consisting of strontium nitrate, strontium acetate, strontium chloride, strontium hydroxide, and combinations thereof.

The titanium precursor may include a member selected from the group consisting of titanium trichloride, titanium glycolate, and combinations thereof.

The polymer compound may include a member selected from the group consisting of starch, glucose, cellulose, crystalline cellulose, pulp, hydroxyl propyl cellulose, and combinations thereof.

In another general aspect, there is provided strontium titanate powder prepared by the above methods, in which a particle size of the strontium titanate powder ranges from 10 nm to 500 nm.

Approximately 50% or more of particles of the strontium titanate powder may have a cubic lattice structure.

In another general aspect, a method of producing strontium titanate powder may involve: forming a reaction mixture comprising a strontium salt, a titanium salt, and a polymer compound, and heating the reaction mixture at a first temperature, the first temperature ranging from approximately 300° C. to 600° C.

The general aspect of the method may further involve heating the reaction mixture at a second temperature, the second temperature ranging from approximately 700° C. to 1,200° C.

A nucleus of a strontium titanate particle may form during the heating of the reaction mixture at the first temperature, and an average size of the nucleus may be less than 100 nm.

The nucleus of the strontium titanate particle may increase in size during the heating of the reaction mixture at the second temperature.

The heating of the reaction mixture at the first temperature may be carried out for at least one hour; and the heating of the reaction mixture at the second temperature may be carried out for at least two hours.

The strontinum salt may include one or more member selected from the group consisting of strontium nitrate, strontium acetate, strontium chloride, strontium hydroxide, and combinations thereof; and the titanium salt comprises one or more member selected from the group consisting of titanium trichloride, titanium glycolate, and combinations thereof.

An average particle size of strontium titanate powder collected from the reaction mixture may range between 70 nm to 130 nm; and 50% or more of particles of the strontium titanate powder may have a cubic lattice structure.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A, B, or A and B".

Hereinafter, illustrative embodiments and examples of the present disclosure will be explained in detail with reference to the accompanying drawings. However, the present disclosure may not be limited thereto.

In a first aspect of the present disclosure, there is provided a method of preparing strontium titanate powder.

Figure 1:
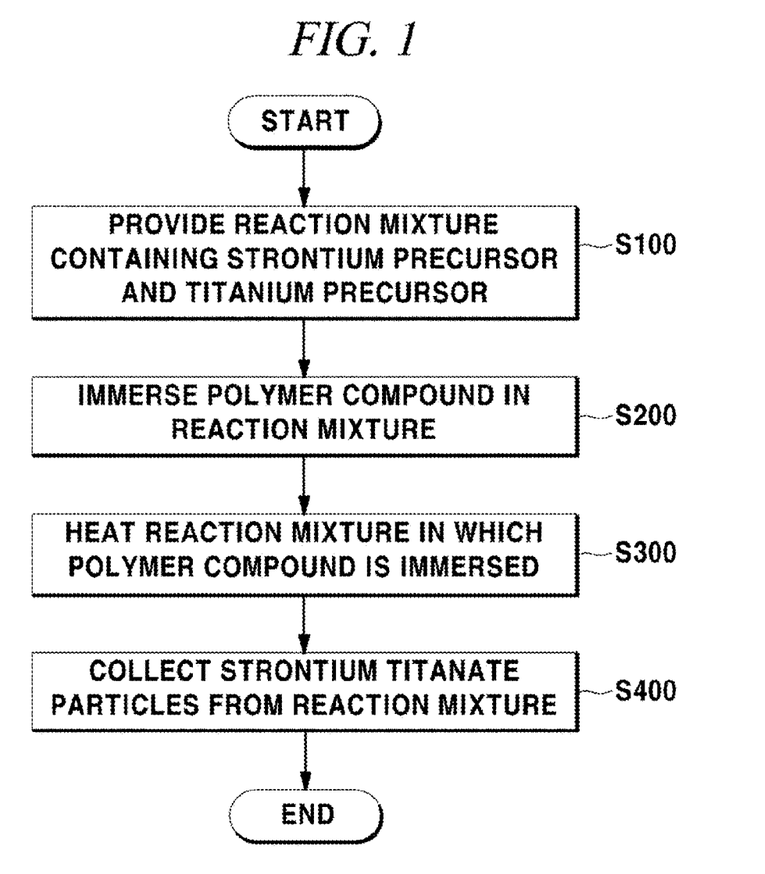
FIG. 1 is a flowchart illustrating an example of a method of preparing crystalline strontium titanate ($SrTiO_3$) powder.

In accordance with an illustrative embodiment of the present disclosure, the method of preparing strontium titanate powder comprises forming a reaction mixture including a strontium precursor and a titanium precursor, as shown in S100 of the flowchart of FIG. 1. The reaction mixture may be an aqueous solution in which a strontium precursor and a titanium precursor are dissolved. The aqueous solution may be a homogenous mixture in which the strontium precursor and the titanium precursor are dissolved and mixed.

By way of example, the strontium precursor includes a member selected from the group consisting of strontium nitrate [Sr(NO$_3$)$_2$], strontium acetate [Sr(C$_2$H$_3$O$_2$)$_2$], strontium chloride (SrCl$_2$), strontium hydroxide [Sr(OH)$_2$], and combinations thereof; however, the present disclosure is not limited thereto. The concentration of the strontium precursor present in the aqueous solution may range from about 10 wt. % to about 20 wt. %; however, the concentration of the strontium precursor is not limited thereto.

By way of example, the titanium precursor includes a member selected from the group consisting of titanium trichloride (TiCl$_3$), titanium glycolate (Ti-glycolate), and combinations thereof; however, the present disclosure is not limited thereto. The concentration of titanium precursor in the aqueous solution may range from about 10 wt. % to about 20 wt. %; however, the concentration is not limited thereto.

In this example, an aqueous solution containing the strontium precursor and an aqueous solution containing the titanium precursor are mixed at room temperature at a mole ratio of about 1:1 with stirring.

Then, a polymer compound is immersed in the reaction mixture containing the strontium precursor and the titanium precursor, in S200. That is, the polymer compound is added to the aqueous solution in which the strontium precursor and the titanium precursor are dissolved. The polymer compound is put into the aqueous solution and uniformly mixed with a hand or a spatula. Then, the mixed polymer compound is put into a dry oven having a temperature of about 80° C. and dried for, but not limited to, from about 2 hours to about 24 hours. In this way, the polymer compound can be immersed in the aqueous solution. The polymer compound may be immersed in the aqueous solution containing the strontium precursor and the titanium precursor at a ratio of, but not limited to, from about 80 wt. % to about 98 wt. %. By way of example, the polymer compound may be immersed in the aqueous solution at a ratio of, but not limited to, from about 80 wt. % to about 98 wt. %, from about 85 wt. % to about 98 wt. %, from about 90 wt. % to about 98 wt. %, from about 95 wt. % to about 98 wt. %, from about 80 wt. % to about 95 wt. %, from about 85 wt. % to about 95 wt. %, from about 90 wt. % to about 95 wt. %, from about 80 wt. % to about 90 wt. %, from about 85 wt. % to about 90 wt. %, or from about 80 wt. % to about 85 wt. %.

In this example, the polymer compound includes a member selected from the group consisting of starch, glucose, cellulose, crystalline cellulose, pulp, hydroxyl propyl cellulose (HPC), and combinations thereof; however, the present disclosure is not limited thereto.

Thereafter, in S300, the reaction mixture in which the polymer compound is immersed is subjected to a heat treatment. In this example, the heat treatment involves a first heat treatment and a second heat treatment, and the first heat treatment and the second heat treatment are carried out sequentially or the second heat treatment is carried out after first heat treatment followed by cooling; however, the present disclosure is not limited thereto. When a large amount of strontium titanate powder is being synthesized, a cooling process may be carried out after the first heat treatment, so that the strontium titanate powder can be synthesized in a large amount during a second synthesis process. In one example, after the first heat treatment is carried out, the aqueous solution may be cooled to room temperature, and then the second heat treatment may be carried out. However, the present disclosure is not limited thereto.

The first heat treatment is carried out at a temperature in a range of, but not limited to, from about 300° C. to about 600° C. For example, the first heat treatment may be carried out at a temperature in a range of, but not limited to, from about 300° C. to about 600° C., from about 350° C. to about 600° C., from about 400° C. to about 600° C., from about 450° C. to about 600° C., from about 500° C. to about 600° C., from about 550° C. to about 600° C., from about 300° C. to about 550° C., from about 350° C. to about 550° C., from about 400° C. to about 550° C., from about 450° C. to about 550° C., from about 500° C. to about 550° C., from about 300° C. to about 500° C., from about 350° C. to about 500° C., from about 400° C. to about 500° C., from about 450° C. to about 500° C., from about 300° C. to about 450° C., from about 350° C. to about 450° C., from about 400° C. to about 450° C., from about 300° C. to about 400° C., from about 350° C. to about 400° C., or from about 300° C. to about 350° C. The first heat treatment may involve heating the reaction mixture at the first temperature for 1 hour or more, 2 hours or more, or 3 hours or more, and less than 4 hours; however, the present disclosure is not limited thereto.

The second heat treatment is carried out at a temperature in a range of, but not limited to, from about 700° C. to about 1,200° C. For example, the second heat treatment may be carried out at a temperature in a range of, but not limited to, from about 700° C. to about 1,200° C., from about 750° C. to about 1,200° C., from about 800° C. to about 1,200° C., from about 900° C. to about 1,200° C., from about 1,000° C. to about 1,200° C., from about 1,100° C. to about 1,200° C., from about 1,150° C. to about 1,200° C., from about 700° C. to about 1,150° C., from about 750° C. to about 1,150° C., from about 800° C. to about 1,150° C., from about 900° C. to about 1,150° C., from about 1,000° C. to about 1,150° C., from about 1,100° C. to about 1,150° C., from about 700° C. to about 1,100° C., from about 750° C. to about 1,100° C., from about 800° C. to about 1,100° C., from about 900° C. to about 1,100° C., from about 1,000° C. to about 1,100° C., from about 700° C. to about 1,000° C., from about 750° C. to about 1,000° C., from about 800° C. to about 1,000° C., from about 900° C. to about 1,000° C., from about 700° C. to about 900° C., from about 750° C. to about 900° C., from about 800° C. to about 900° C., from about 700° C. to about 800° C., from about 750° C. to about 800° C., or from about 700° C. to about 750° C. The second heat treatment may involve heating the reaction mixture at the second temperature for 1 hour or more, 2 hours or more, 3 hours or more, or 4 hours or more, 5 hours or more, and 6 hours or more; however, the present disclosure is not limited thereto.

In S400, particles of strontium titanate are collected from the reaction mixture. The strontium titanate powder is obtained by calcination of the reaction mixture, since the reaction mixture was burned out through the calcination except the synthesized strontium titanate.

Through the heat treatment, strontium titanate powder having nanoscale particles can be synthesized. Through the first heat treatment, it is possible to form a nucleus, and through the second heat treatment, a crystal can be grown so as to increase a degree of crystallinity. Depending on a temperature of the second heat treatment, the strontium titanate powder may have a particle size in a range of, but not limited to, from about 10 nm to about 500 nm. By way of example, when a temperature of the second heat treatment is about 800° C., a particle size of the prepared strontium titanate powder may be, but not limited to, about 80 nm. By way of example, when a temperature of the second heat treatment is about 900° C., a particle size of the prepared strontium titanate powder may be, but not limited to, about 120 nm.

In a second aspect of the present disclosure, there is provided strontium titanate ($SrTiO_3$) powder prepared by the method according to the first aspect of the present disclosure and having a particle size in a range of from about 10 nm to about 500 nm.

A particle size of the strontium titanate powder in accordance with the present disclosure may be in a range of, but not limited to, from about 10 nm to about 500 nm, from about 50 nm to about 500 nm, from about 100 nm to about 500 nm, from about 150 nm to about 500 nm, from about 200 nm to about 500 nm, from about 250 nm to about 500 nm, from about 300 nm to about 500 nm, from about 350 nm to about 500 nm, from about 400 nm to about 500 nm, from about 450 nm to about 500 nm, from about 10 nm to about 450 nm, from about 50 nm to about 450 nm, from about 100 nm to about 450 nm, from about 150 nm to about 450 nm, from about 200 nm to about 450 nm, from about 250 nm to about 450 nm, from about 300 nm to about 450 nm, from about 350 nm to about 450 nm, from about 400 nm to about 450 nm, from about 10 nm to about 400 nm, from about 50 nm to about 400 nm, from about 100 nm to about 400 nm, from about 150 nm to about 400 nm, from about 200 nm to about 400 nm, from about 250 nm to about 400 nm, from about 300 nm to about 400 nm, from about 350 nm to about 400 nm, from about 10 nm to about 350 nm, from about 50 nm to about 350 nm, from about 100 nm to about 350 nm, from about 150 nm to about 350 nm, from about 200 nm to about 350 nm, from about 250 nm to about 350 nm, from about 300 nm to about 350 nm, from about 10 nm to about 300 nm, from about 50 nm to about 300 nm, from about 100 nm to about 300 nm, from about 150 nm to about 300 nm, from about 200 nm to about 300 nm, from about 250 nm to about 300 nm, from about 10 nm to about 250 nm, from about 50 nm to about 250 nm, from about 100 nm to about 250 nm, from about 150 nm to about 250 nm, from about 200 nm to about 250 nm, from about 10 nm to about 200 nm, from about 50 nm to about 200 nm, from about 100 nm to about 200 nm, from about 150 nm to about 200 nm, from about 10 nm to about 150 nm, from about 50 nm to about 150 nm, from about 100nm to about 150 nm, from about 10 nm to about 100 nm, from about 50 nm to about 100 nm, or from about 10 nm to about 50 nm.

In one example, about 50% or more of particles of the strontium titanate powder have a cubic lattice crystalline structure; however, the present disclosure is not limited thereto. For instance, in another example, about 50% or more, about 55% or more, about 60% or more, about 65% or more, about 70% or more, about 75% or more, about 80% or more, about 85% or more, or about 90% or more of particles may have a cubic lattice structure. As the crystallinity of the strontium titanate powder is increased, a dielectric element using the strontium titanate powder can be miniaturized while maintaining high capacity; however, the present disclosure is not limited thereto.

Hereinafter, examples of the present disclosure will be explained in detail. However, the examples are provided for illustrative purposes, and the present disclosure is not limited thereto.

EXAMPLE

Synthesis of Strontium Titanate using Strontium Acetate [$Sr(CH_3COO)_2$] as Strontium Precursor Firstly, about 50 g of strontium acetate [$Sr(CH_3COO)_2$] was put into a reactor and about 250 mL of an aqueous solution was added thereto with stirring, so that a homogenous aqueous solution containing the strontium acetate was prepared.

Meanwhile, titanium trichloride ($TiCl_3$) was put into another reactor and about 7.969 mL of an aqueous solution was added thereto with stirring, so that a homogenous aqueous solution containing the titanium trichloride was prepared.

The aqueous solution containing the strontium acetate and the aqueous solution containing the titanium trichloride were stirred at room temperature mixed at a mole ratio of about 1:1, so that an aqueous solution containing the strontium acetate and the titanium trichloride was prepared.

Then, cellulose was immersed in the aqueous solution containing the strontium acetate and the titanium trichloride at room temperature at a weight ratio of about 1:1, and the aqueous solution containing the strontium acetate and the titanium trichloride in which the cellulose was immersed was dried at about 80° C. for about 2 hours.

Thereafter, a heat treatment was carried out to the aqueous solution containing the strontium acetate and the titanium trichloride at about 500° C. for about 2 hours. Then, the heat-treated aqueous solution containing the strontium acetate and the titanium trichloride was cooled to about 25° C. After the cooling process was completed, a second heat treatment was carried out to the aqueous solution containing the strontium acetate and the titanium trichloride at about 800° C. for about 4 hours.

Figure 2A:
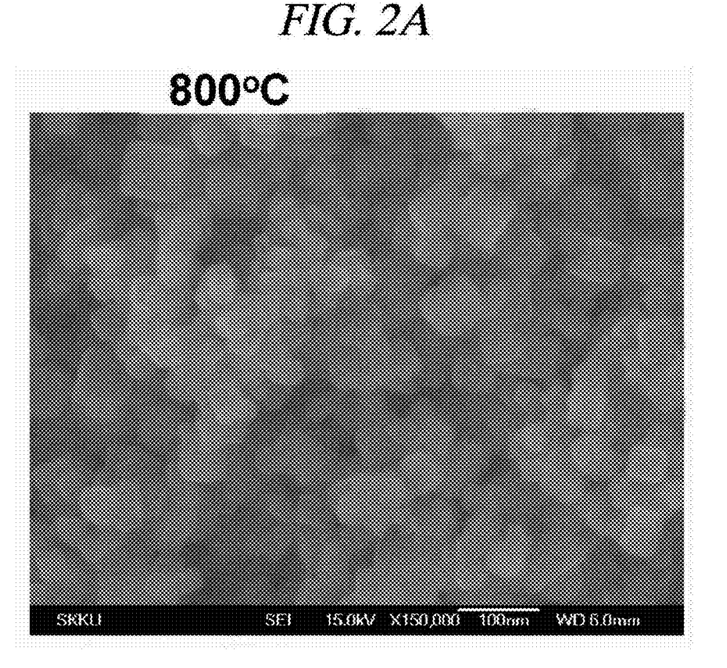
FIG. 2A is a scanning electron microscope (SEM) image of strontium titanate prepared using $Sr(CH_3COO)_2$ at a temperature of approximately 800° C. in accordance with an example of the present disclosure.

A SEM image of strontium titanate prepared by the above-described method is illustrated in FIG. 2A. As illustrated in FIG. 2A, the strontium titanate powder prepared by the present example has a cubic lattice structure with a particle size of about 80 nm.

Figure 2B:
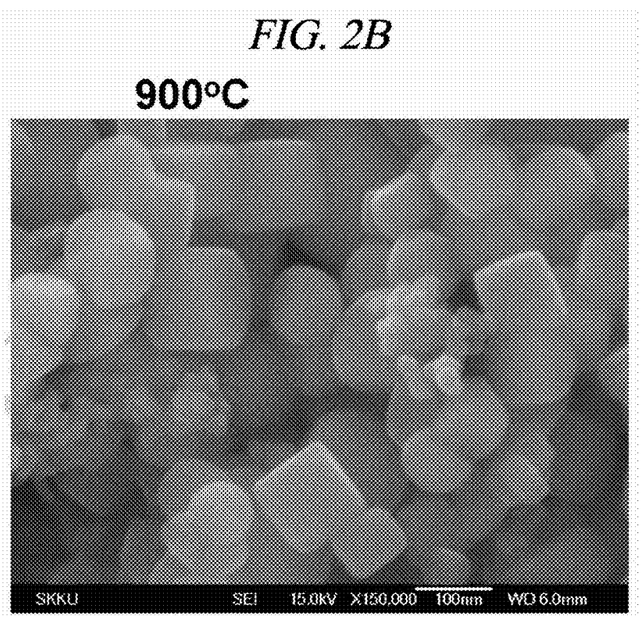
FIG. 2B is an SEM image of strontium titanate prepared using Sr(CH3COO)$_2$ at a temperature of approximately 800° C. and then at a temperature of approximately 900° C. in accordance with an example of the present disclosure.

Further, it is demonstrated that, in the same method as describe above, when the second heat treatment was carried out at about 900° C., strontium titanate has a cubic lattice structure with a particle size of about 120 nm, as illustrated in FIG. 2B.

Synthesis of Strontium Titanate using Strontium Nitrate [$Sr(NO_3)_2$] as Strontium Precursor Firstly, about 50 g of strontium nitrate [$Sr(NO_3)_2$] was put into a reactor and about 250 mL of an aqueous solution was added thereto with stirring, so that a homogenous aqueous solution containing the strontium nitrate was prepared.

Meanwhile, titanium trichloride ($TiCl_3$) was put into another reactor and about 7.97 mL of an aqueous solution was added thereto with stirring, so that a homogenous aqueous solution containing the titanium trichloride was prepared.

The aqueous solution containing the strontium nitrate and the aqueous solution containing the titanium trichloride were stirred at room temperature and mixed at a molar ratio of about 1:1, so that an aqueous solution containing both the strontium nitrate and the titanium trichloride was prepared.

Then, cellulose was immersed in the aqueous solution containing the strontium nitrate and the titanium trichloride at room temperature at a weight ratio of about 1:1.

Thereafter, the aqueous solution containing the strontium nitrate and the titanium trichloride in which the cellulose was immersed was dried at about 80° C. for about 2 hours. Then, a heat treatment was carried out to the aqueous solution containing the strontium nitrate and the titanium trichloride at about 500° C. for about 2 hours. Thereafter, the heat-treated aqueous solution containing the strontium nitrate and the titanium trichloride was cooled to about 25° C. After the cooling process was completed, a second heat treatment was carried out to the aqueous solution containing the strontium nitrate and the titanium trichloride at about 800° C. for about 4 hours.

Figure 3A:
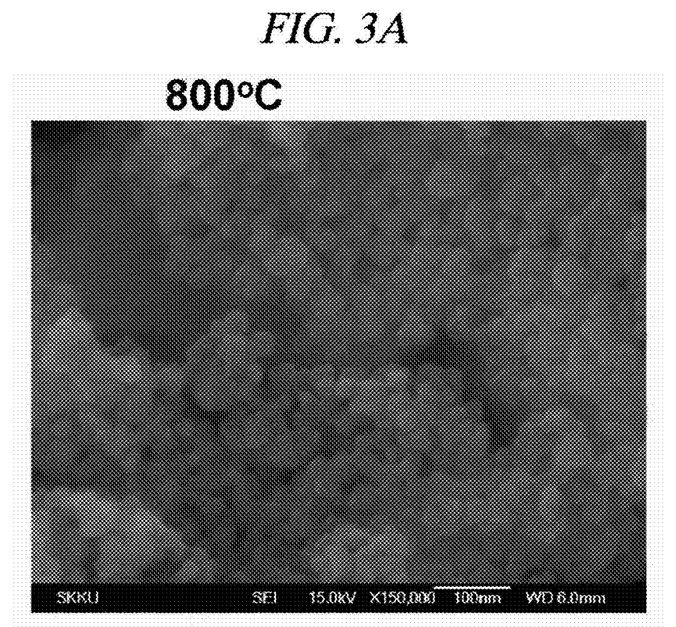
FIG. 3A is an SEM image of strontium titanate prepared using $Sr(NO_3)_2$ at a temperature of approximately 800° C. in accordance with an example of the present disclosure.

A SEM image of strontium titanate prepared by the above-described method is shown in FIG. 3A. As demonstrated by FIG. 3A, the strontium titanate powder prepared by the present example has a cubic lattice structure with a particle size of approximately 80 nm.

Figure 3B:
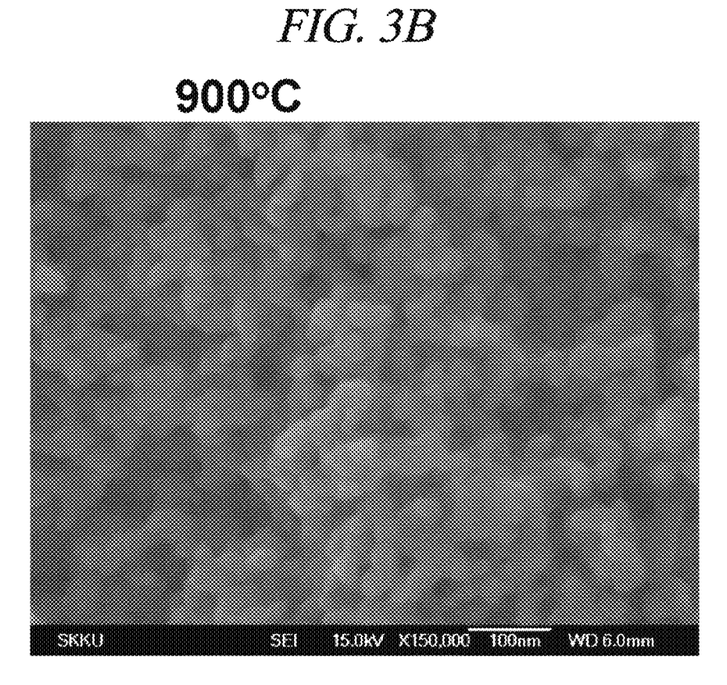
FIG. 3B is an SEM image of strontium titanate prepared using $Sr(NO_3)_2$ at a temperature of approximately 800° C. and then at a temperature of approximately 900° C. in accordance with an example of the present disclosure.

Further, in the same method as describe above, when the second heat treatment was further carried out at about 900° C., the strontium titanate particles had a cubic lattice structure with a particle size of about 100 nm as illustrated in FIG. 3B.

Result

Figure 4A:
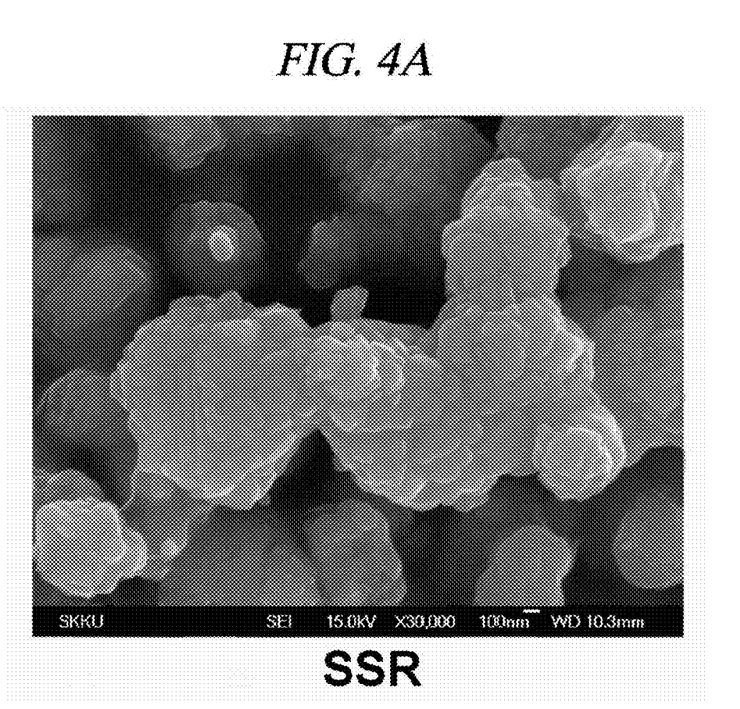
FIG. 4A is an SEM image of strontium titanate prepared by a solid state reaction (SSR) process.
Figure 4B:
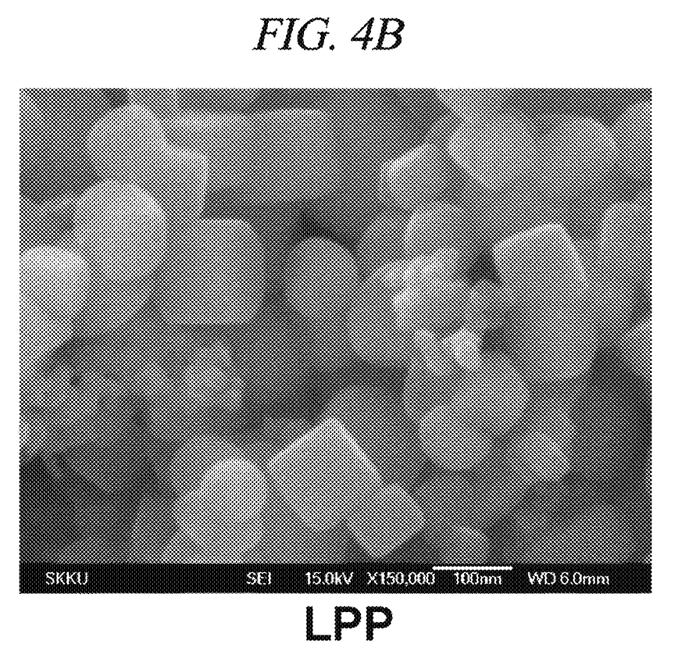
FIG. 4B is a SEM image of strontium titanate prepared by a liquid phase precursor (LPP) process in accordance with an example of the present disclosure.

FIG. 4A is a SEM image of strontium titanate prepared by a conventional solid state reaction (SSR) process, and FIG. 4B is a SEM image of strontium titanate prepared by a liquid phase precursor (LPP) process in accordance with the present example. FIGS. 4A and 4B illustrate that, when strontium titanate was prepared by the conventional SSR process, the strontium titanate did not exhibit uniformity in crystal structure; however, when strontium titanate was prepared by the LPP process in accordance with the present example, the strontium titanate exhibited a cubic crystal structure.

Figure 5:
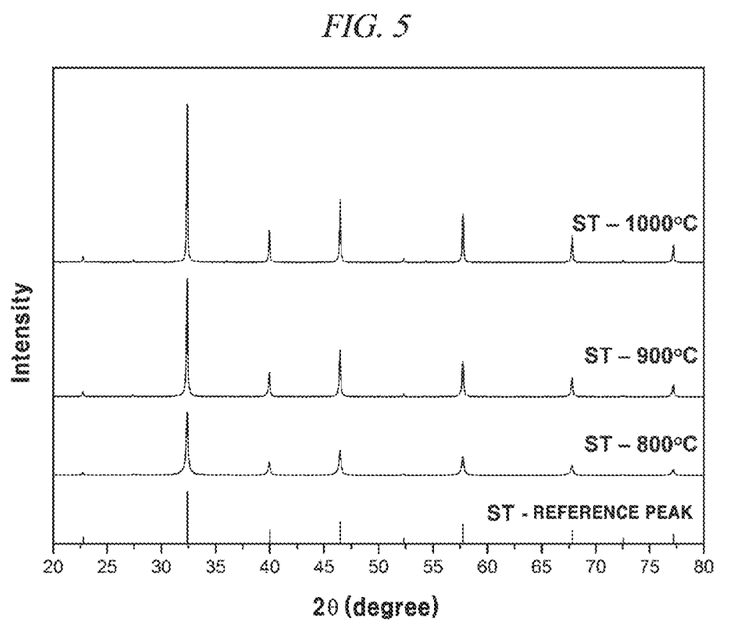
FIG. 5 illustrates X-ray diffraction patterns of crystal structures of strontium titanate produced using $Sr(CH_3COO)_2$ in accordance with an example of the present disclosure.
Figure 6:
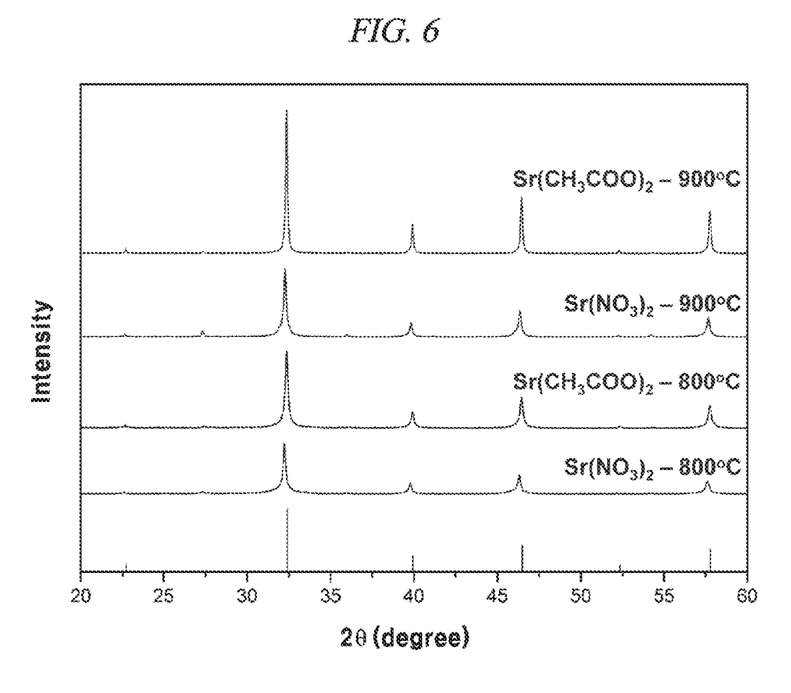
FIG. 6 illustrates X-ray diffraction patterns of crystal structures of strontium titanate produced using $Sr(CH_3COO)_2$ and $Sr(NO_3)_2$ in accordance with an example of the present disclosure.
Figure 7:
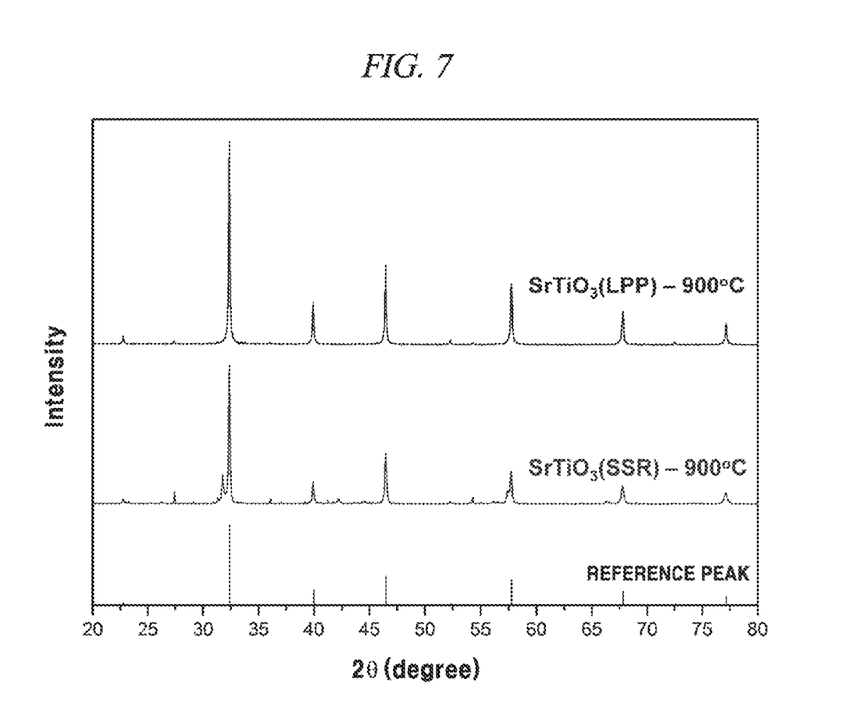
FIG. 7 illustrates an X-ray diffraction pattern of crystal structures of strontium titanate prepared by a conventional SSR process, and an X-ray diffraction pattern of crystal structures of strontium titanate prepared by a LPP process in accordance with an example of the present disclosure.

FIG. 5 illustrates X-ray diffraction patterns of crystal structures of strontium titanate using $Sr(CH_3COO)_2$ in accordance with the present example. FIG. 6 illustrates X-ray diffraction patterns of crystal structures of strontium titanate using $Sr(CH_3COO)_2$ and $Sr(NO_3)_2$ in accordance with the present example. FIG. 7 illustrates (a) X-ray diffraction patterns of crystal structures of strontium titanate prepared by the conventional SSR process, and (b) X-ray diffraction patterns of crystal structures of strontium titanate prepared by the LPP process in accordance with the present example. It could be seen that pure nanoscale $SrTiO_3$ powder could not be obtained by the SSR process, whereas nanoscale $SrTiO_3$ powder having a good crystallinity could be obtained by the LPP process in accordance with the present example.

Various examples of methods of preparing strontium titanate ($SrTiO_3$) powder have been described above. The crystalline strontium titanate ($SrTiO_3$) powder obtained by an example embodiment described above may be used as a suitable material of electronic ceramics in various fields such as ferroelectrics, piezoelectric elements, capacitors, and thermistors.

In a first aspect of the present disclosure, there is provided a method of preparing strontium titanate powder comprising: providing an aqueous solution that contains a strontium precursor and a titanium precursor; immersing a polymer compound in the aqueous solution; and performing a heat treatment to the aqueous solution in which the polymer compound is immersed.

In accordance with an illustrative embodiment of the present disclosure, the heat treatment includes a first heat treatment and a second heat treatment, and the first heat treatment and the second heat treatment are carried out sequentially or the second heat treatment is carried out after first heat treatment followed by cooling, but the present disclosure may not be limited thereto.

In accordance with an illustrative embodiment of the present disclosure, the first heat treatment is carried out at a temperature in a range of from about 300° C. to about 600° C.; however, the present disclosure is not limited thereto.

In accordance with an illustrative embodiment of the present disclosure, the second heat treatment is carried out at a temperature in a range of from about 700° C. to about 1,200° C.; however, the present disclosure is not limited thereto.

In accordance with an illustrative embodiment of the present disclosure, the strontium precursor includes one or more members selected from the group consisting of strontium nitrate [$Sr(NO_3)_2$], strontium acetate [$(Sr(C_2H_3O_2)_2$], strontium chloride ($SrCl_2$), strontium hydroxide [$Sr(OH)_2$]; and combinations thereof, but the present disclosure is not limited thereto.

In accordance with an illustrative embodiment of the present disclosure, the titanium precursor includes a member selected from the group consisting of titanium trichloride ($TiCl_3$), titanium glycolate (Ti-glycolate), and combinations thereof; however, the present disclosure is not limited thereto.

In accordance with an illustrative embodiment of the present disclosure, the polymer compound includes a member selected from the group consisting of starch, glucose, cellulose, crystalline cellulose, pulp, hydroxyl propyl cellulose (HPC), and combinations thereof; however, the present disclosure is not limited thereto.

In a second aspect of the present disclosure, there is provided strontium titanate ($SrTiO_3$) powder prepared by the method according to the first aspect of the present disclosure and having a particle size in a range of from about 10 nm to about 500 nm.

In accordance with an illustrative embodiment of the present disclosure, 50% or more of particles of the strontium titanate powder have a cubic lattice; however, the present disclosure is not limited thereto.

In accordance with the present disclosure, when a liquid-phase precursor method is used, unlike in a conventional liquid-phase method, a drying process is not needed; thus, it is possible to prepare nanoscale crystalline strontium titanate powder that is not sensitive to moisture and can be mass-produced.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

We claim:

1. A method of preparing strontium titanate powder, comprising:
   providing an aqueous solution comprising a strontium precursor and a titanium precursor;
   immersing a polymer compound in the aqueous solution; and
   heating the aqueous solution in which the polymer compound is immersed,
   wherein the heating of the aqueous solution comprises performing a first heat treatment and a second heat treatment, and the first heat treatment and the second heat treatment are carried out sequentially or cooling is performed after the first heat treatment and before the second heat treatment;
   wherein a nucleus of the strontium titanate powder is formed through the first heat treatment, and a particle size of the strontium titanate powder is grown through the second heat treatment so as to increase a degree of crystallinity, and
   wherein 50% or more of particles of the strontium titanate powder have a cubic lattice structure.

2. The method of claim 1,
   wherein the first heat treatment comprises heating the aqueous solution to a temperature in a range of approximately 300° C. to 600° C.

3. The method of claim 1,
   wherein the second heat treatment comprises heating the aqueous solution to a temperature in a range of approximately 700° C. to 1,200° C.

4. The method of claim 1,
   wherein the strontium precursor comprises a member selected from the group consisting of strontium nitrate, strontium acetate, strontium chloride, strontium hydroxide, and combinations thereof.

5. The method of claim 1,
   wherein the titanium precursor comprises a member selected from the group consisting of titanium trichloride, titanium glycolate, and combinations thereof.

6. The method of claim 1,
   wherein the polymer compound comprises a member selected from the group consisting of starch, glucose, cellulose, crystalline cellulose, pulp, hydroxyl propyl cellulose, and combinations thereof.

7. Strontium titanate powder prepared by the method of claim 1,
   wherein a particle size of the strontium titanate powder ranges from 10 nm to 500 nm.

8. A method of producing strontium titanate powder, comprising:
   forming a reaction mixture comprising a strontium salt, a titanium salt, and a polymer compound;
   heating the reaction mixture at a first temperature, the first temperature ranging from approximately 300° C. to 600° C., such that a nucleus of a strontium titanate particle forms, and
   heating the reaction mixture at a second temperature such that the nucleus of the strontium titanate particle increases in size,
   wherein 50% or more of particles of the strontium titanate powder have a cubic lattice structure.

9. The method of claim 8,
   wherein the second temperature ranges from approximately 700° C. to 1,200° C.

10. The method of claim 8, wherein an average size of the nucleus is less than 100 nm.

11. The method of claim 9, wherein the heating of the reaction mixture at the first temperature is carried out for at least one hour; and the heating of the reaction mixture at the second temperature is carried out for at least two hours.

12. The method of claim 8, wherein the strontinum salt comprises one or more member selected from the group consisting of strontium nitrate, strontium acetate, strontium chloride, strontium hydroxide, and combinations thereof; and the titanium salt comprises one or more member selected from the group consisting of titanium trichloride, titanium glycolate, and combinations thereof.

13. The method of claim 8, wherein an average particle size of strontium titanate powder collected from the reaction mixture ranges between 70 nm to 130 nm.

* * * * *